United States Patent Office 3,235,859
Patented Feb. 15, 1966

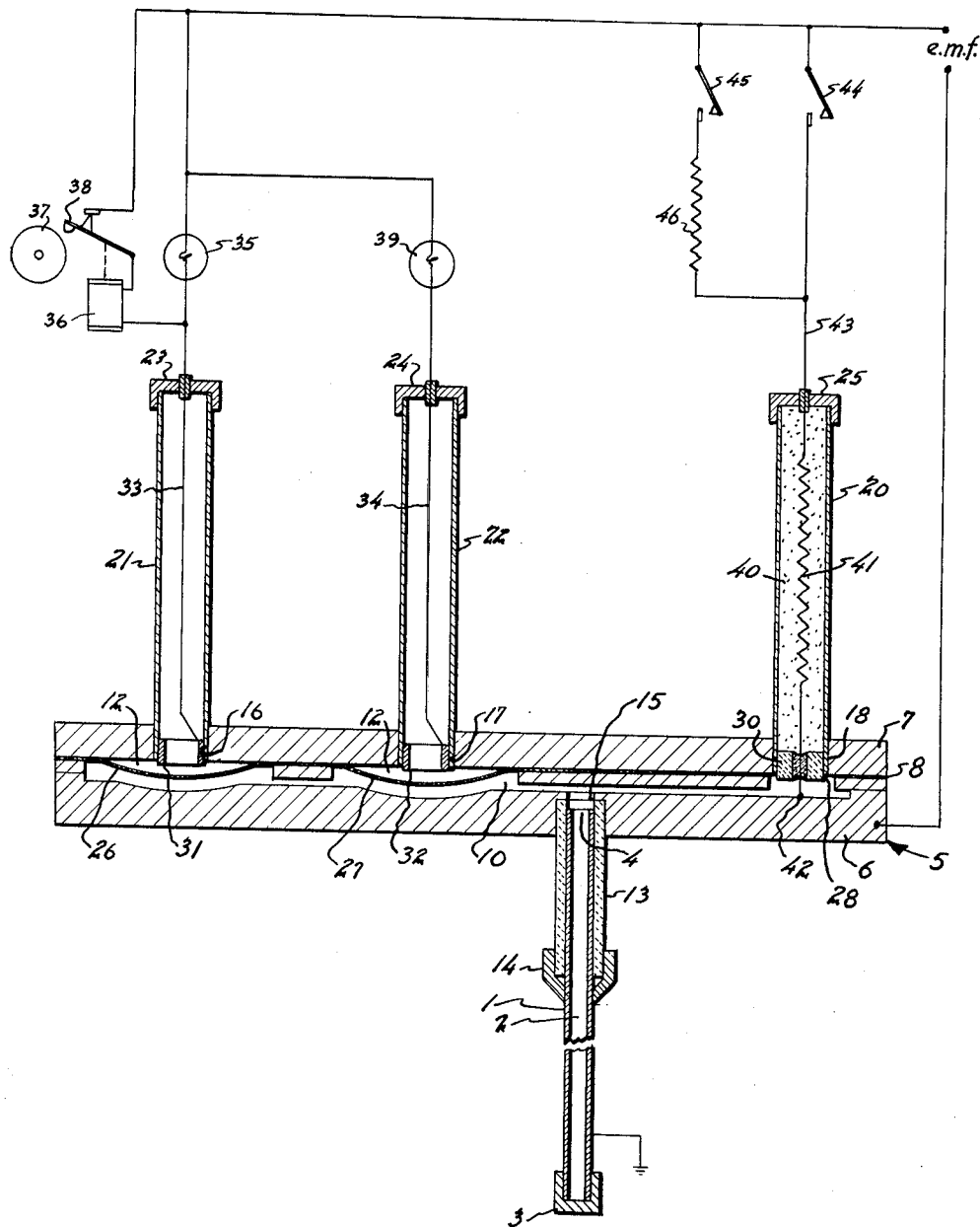

3,235,859
FIRE DETECTION SYSTEM
John E. Lindberg, Jr., 1211 Upper Happy Valley Road, Lafayette, Calif.
Filed Feb. 8, 1962, Ser. No. 171,913
7 Claims. (Cl. 340—214)

This invention relates to a fire detection system having a device for testing whether it will operate. This application is a continuation-in-part of application Serial Number 815,406, filed May 25, 1959, now Patent No. 3,122,728.

This invention is of the type in which the heat-detecting sensor is a closed tube filled with a gas. When heated, the gas in the sensor increases the pressure inside the tube and, at a critical temperature, actuates a snap-action diaphragm, forming part of a unit which I call a responder, and thereby actuates an electrical circuit containing a warning or indicator device.

An object of the invention is to provide an improved test means for enabling one to determine whether the responder is operative and the sensor is intact.

Another object is to enable the same test means to test for operation at two different temperature levels.

Other objects and advantages of the invention will appear from the following description of a preferred form thereof.

The drawing is an enlarged view in elevation and in section of a temperature detection system embodying the principles of the invention, with the sensor broken in the middle in order to conserve space and with the electrical circuit shown diagrammatically.

A tube 1 of small interior diameter encloses a suitable gas 2, such as argon or neon. The tube 1 may be stainless steel or any other suitable imperforate material; its outer end 3 is closed, and its inner end 4 is connected to a responder 5. The responder 5 may comprise a lower plate 6, an upper plate 7, and a diaphragm 8 sandwiched between the plates 6 and 7. All three may be metal, such as molybdenum, and may be brazed together. The diaphragm 8 divides the interior of the responder 5 into a sensor chamber 10 on one side of the diaphragm 8 and two anti-sensor chambers 11 and 12 on the other side, and separated from each other. The sensor 1 communicates with the sensor chamber 10 and is preferably electrically insulated from the lower plate 6 by an insulator 13, to which it is secured with the aid of a cap 14. The lower plate 6 is imperforate except for a central opening 15 joining the sensor chamber 10 to the gas-filled interior of the tube 1. The upper plate 7 has a plurality of openings 16, 17, and 18. It may have more or only two. Secured in each opening is an insulating tube 20, 21, 22, each tube being fully sealed and closed at its outer end, as by a cap 23, 24, 25. The tube 21 in the opening 16 communicates with the anti-sensor chamber 11, and lies opposite a blister 26 (a hemispherical stretched part of the diaphragm 8). The tube 22 in the opening 17 communicates with the anti-sensor chamber 12 and lies opposite a blister 27 of the diaphragm 8.

The tube 20 in the opening 18 communicates with the sensor chamber 10, through an opening 28 through the diaphragm 8. A perforate plug 30 is provided at the bottom of the tube 20, and electrodes 31 and 32 are provided at the lower ends of the tubes 21 and 22 opposite the blisters 26 and 27. The interiors of the tubes 21 and 22 are pressurized at different levels, or other provision is made to cause actuation of the diaphragm blisters 26 and 27 at different pressures obtaining in the sensor chamber 10. A lead 33 from the electrode 31 goes through the cap 23, and a lead 34 goes from the electrode 32 through the cap 24. The lead 33 is connected to a suitable E.M.F. through a warning signal lamp 35 and also through a relay 36 having an associated bell 37 and a bell ringing switch 38. The lead 34 is connected to the same E.M.F. through a signal lamp 39.

The interior of the tube 20 is filled with a suitable gas-emitting agent 40, preferably a metallic hydride, of the type that emits gas when heated and reingasses when cooled. Powdered titanium hydride may be used as may the hydrides of alkali metals, of alkaline earth metals and those of scandium, vanadium, ytterbium, zirconium, palladium, niobium, hafnium, tantalum, the rare earth metals, and the actinide metals.

A heating filament 41 in the tube 20 is connected at one end 42 to the lower plate 6 and at the other end to a lead 43 going out of the cap 25. A manual switch 44 connects the lead 43 directly to the E.M.F., and a second manual switch 45 connects the lead 43 to the E.M.F. through a resistor 46. A return line 47 leads from a point on the responder 5 to the E.M.F., or, if desired, a grounded connection may be used.

For normal operation, the sensor tube 1, which may be substantially filamentary and many feet long, is exposed to a desired zone. The pressure in the tube 1 and sensor chamber 10 is a function of the average temperature of the sensor tube 1. When gas 2 reaches a predetermined average temperature, the pressure in the sensor chamber 10 forces the diaphragm blister 27 against its electrode 32, and causes the lamp 39 to light. At a higher predetermined average temperature, a consequent higher pressure in the sensor chamber 10 causes the blister 26 to move against its electrode 31 and causes the lamp 35 to light and the bell 37 to ring.

For test, the switch 45 is first closed, and the resistor 46 sends a limited current through the filament 41 and heats the filament. The hydride 40 is heated and releases large quantities of hydrogen in a predetermined amount depending on the value of the current through the known resistance of the filament. Unless there is a leak in the system or a ruptured diaphragm 8, the pressure in the sensor chamber 10 and sensor 1 is increased until the blister 27 is moved against the electrode 32, lighting the lamp 39.

Now, the switch 45 may be opened and the switch 44 closed, sending a higher current to the filament 41. The heat is calculated to liberate enough hydrogen from the hydride 40 to actuate the blister 26 and light the lamp 35 and ring the bell 37, unless the sensor 1 or responder 5 is defective. When both the switches 44 and 45 are opened, the hydride 40 takes up all the released hydrogen. The device is then ready to operate in the normal manner.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A fire detection system including in combination:
   an imperforate first tube, closed except at one end and filled only with gas;
   a housing into which said one end enters;
   a diaphragm cooperating with said housing to define a first chamber communicating with said tube and a second chamber on the opposite side of said diaphragm;
   signal means actuated by movement of said diaphragm resulting from predetermined pressure in said tube and said first chamber for indicating the reaching of said predetermined pressure in said tube and first chamber;

a second tube opening into said first chamber and otherwise closed;

gas-emitting material substantially filling said second tube of the type that emits gas when heated and takes it up when cooled; and heating means for heating said material and causing it to emit gas so as to test the action of said system, whereby the gas in said first tube averages temperatures along said first tube, substantially unaffected by the presence of the second tube, which provides only negligible space for free gas, said material taking up its emitted gas when said heating means is off and said material cooled.

2. A fire detection system, including in combination:

an imperforate tube, closed except at one end and filled with gas alone;

a housing into which said one end enters;

a diaphragm cooperating with said housing to define a first chamber communicating with said tube and a second chamber on the opposite side of said diaphragm;

signal means actuated by movement of said diaphragm resulting from predetermined pressure in said tube and said first chamber for indicating the reaching of said predetermined pressure in said tube and first chamber;

a second tube opening into said first chamber and otherwise closed;

a metallic hydride substantially filling said second tube of the type that emits hydrogen when heated and takes it up when cooled; and heating means for heating said hydride and causing it to emit hydrogen so as to test the action of said system, whereby the gas in the first-mentioned said tube is able to average the temperatures along its length without substantial error being introduced by the volume of said second tube, and said hydrogen is used to test said system and then withdrawn into said hydride in said second tube where it does not affect the action of the gas in said first-mentioned tube.

3. A fire detection system, including in combination:

an imperforate tube, closed except at one end and filled exclusively with gas;

a housing into which said one end enters;

a diaphragm cooperating with said housing to define a first chamber communicating with said tube and a plurality of other chambers on the opposite side of said diaphragm;

signal means in each of said other chambers actuated by movement of said diaphragm resulting from different predetermined increases in pressure in said first chamber for signalling the reaching of each of those predetermined pressures in said first chamber;

a second tube opening into said first chamber and otherwise closed;

metallic hydride in said second tube of the type that emits hydrogen when heated and takes it up when cooled; and electrical heating means for heating said hydride and causing it to emit hydrogen so as to test the action of said system.

4. The system of claim 3 wherein there are a plurality of switches in said electrical heating means to provide different amounts of heat suitable for actuating each said signal means separately.

5. An overheat detection system comprising:

a generally filamentary enclosure of extended length having an end portion;

gas in said enclosure responsive to the average temperature therealong for increasing the pressure within said enclosure;

a pressure-actuated electrical switch at said end of said enclosure;

an electrical circuit incorporating said switch and closed when said switch is actuated to a closed position;

an indicator in said circuit, actuated by closure thereof;

a tube opening into said enclosure and otherwise closed;

a reversible gas-emitting transducing agent substantially filling said tube; and electrical heating means for heating said last-named agent and causing it to emit gas, so as to test the action of said system, the agent's reversible action taking up its emitted gas upon cooling, whereby the total volume filled by said gas is substantially unaffected by said tube, so that the averaging function of said enclosure and said gas remains accurate while said tube and said agent enable increasing gas pressure in said enclosure for testing and then withdrawing the test gas from said enclosure into said tube.

6. A fire and overheat detection system comprising:

a tube containing gas only;

a diaphragm;

a housing divided by said diaphragm into three chambers, namely, a sensor chamber in communication with said transducing agent and the gas elaborated therefrom and first and second anti-sensor chambers isolated from each other and said sensor chamber;

a switch in each said anti-sensor chamber and actuated by said diaphragm at a different pressure level for each said anti-sensor chamber;

an electrical circuit for each said switch and actuated thereby, each said circuit including an indicator actuated by said circuit; and a test device for each circuit, said test device comprising:

a second tube in communication with said sensor chamber and containing a transducing agent for reversibly emitting gas when heated and taking up the gas when cooled, an electrical heating element for said transducing agent, a current source, and a pair of switches in parallel, each connecting said source to said heating element in a series arrangement of different resistance levels, one to actuate each of said switches in said anti-sensor chambers.

7. The system of claim 6 wherein each said anti-sensor chamber is at a different internal pressure.

References Cited by the Examiner

UNITED STATES PATENTS

| 1,219,143 | 3/1917 | Nolen | 340—229 |
| 1,684,530 | 9/1928 | Bast | 200—140 |
| 2,493,351 | 1/1950 | Jones | 340—229 |
| 3,041,821 | 7/1962 | Lindberg | 340—213 |

FOREIGN PATENTS 11,393  3/1914  Great Britain.

OTHER REFERENCES

Gibbs, Jr.: T.R.P., "Hydrides," in Journal of Chemical Education, October 1948 (pp. 577–582 relied on).

"Continuous Tube Fire Detector," in Aviation Week, vol. 52, No. 18, May 1, 1950; pp. 25.

Sneed, M. C., et al.: Comprehensive Inorganic Chemistry, vol. 6, Princeton, N.J., D. Van Nostrand Co., Inc., 1957, pp. 122–117 relied on.

NEIL C. READ, *Primary Examiner.*